US012676638B2

(12) United States Patent
Longstreet et al.

(10) Patent No.: US 12,676,638 B2
(45) Date of Patent: Jul. 7, 2026

(54) CONFIGURABLE FILTER FOR ASYMMETRICAL RADIO FREQUENCY COMMUNICATION

(71) Applicant: Skyworks Solutions, Inc., Irvine, CA (US)

(72) Inventors: Daniel Louis Longstreet, Greensboro, NC (US); Jeffrey Gordon Strahler, Greensboro, NC (US)

(73) Assignee: Skyworks Solutions, Inc., Irvine, CA (US)

( * ) Notice: Subject to any disclaimer, the term of this patent is extended or adjusted under 35 U.S.C. 154(b) by 356 days.

(21) Appl. No.: 18/459,197

(22) Filed: Aug. 31, 2023

(65) Prior Publication Data

US 2024/0080048 A1 Mar. 7, 2024

Related U.S. Application Data

(60) Provisional application No. 63/374,803, filed on Sep. 7, 2022.

(51) Int. Cl.
H04B 1/00 (2006.01)
H04B 1/66 (2006.01)

(52) U.S. Cl.
CPC ........... H04B 1/0057 (2013.01); H04B 1/667 (2013.01)

(58) Field of Classification Search
CPC .... H04B 1/005; H04B 1/0053; H04B 1/0057; H04B 1/006; H04B 1/40; H04B 1/401; H04B 1/44; H04B 1/50; H04B 1/66; H04B 1/667
See application file for complete search history.

(56) References Cited

U.S. PATENT DOCUMENTS

| | | | |
|---|---|---|---|
| 7,656,251 B1 * | 2/2010 | Bauder | H04B 1/52 |
| | | | 333/133 |
| 9,572,052 B2 | 2/2017 | King et al. | |
| 10,080,192 B2 | 9/2018 | Balteanu et al. | |
| 10,979,088 B2 | 4/2021 | Chang et al. | |
| 11,349,510 B2 * | 5/2022 | Nakajima | H04B 1/0057 |
| 11,665,731 B2 * | 5/2023 | Kim | H04W 76/15 |
| | | | 370/329 |
| 2011/0249599 A1 * | 10/2011 | Kaluzni | H04B 1/0057 |
| | | | 370/281 |
| 2018/0294858 A1 | 10/2018 | Pehlke | |
| 2021/0408985 A1 | 12/2021 | Arkiszewski et al. | |
| 2022/0247370 A1 | 8/2022 | Khesbak et al. | |
| 2022/0247441 A1 | 8/2022 | Cho et al. | |
| 2023/0020586 A1 | 1/2023 | Kasnavi et al. | |
| 2023/0063006 A1 | 3/2023 | Khesbak et al. | |
| 2023/0080564 A1 | 3/2023 | Pehlke et al. | |
| 2023/0144780 A1 * | 5/2023 | Pehlke | H04B 1/406 |
| | | | 455/188.1 |

* cited by examiner

*Primary Examiner* — Quochien B Vuong
(74) *Attorney, Agent, or Firm* — VIA LLP

(57) ABSTRACT

Configurable filters for asymmetrical radio frequency communication are disclosed. In one aspect, a radio frequency module includes a first filter configured to band-pass frequencies for a first transmit sub-band of a first communication band, a second filter configured to band-pass frequencies for a second transmit sub-band of the first communication band, and a third filter configured to band-pass frequencies for a receive band of the first communication band. The radio frequency module further includes an antenna terminal and at least one antenna switch module configured to connect the third filter and one of the first and second filters to the antenna terminal.

20 Claims, 9 Drawing Sheets

CONFIGURABLE FILTER FOR ASYMMETRICAL RADIO FREQUENCY COMMUNICATION

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

BACKGROUND

Field

Embodiments of this disclosure relate to radio frequency front end modules that include configurable filters.

Description of the Related Technology

With 5G development, the available bandwidth for radio frequency (RF) communication may be higher than for previous RF communications standards. However, there are many challenges to allocating the available bandwidth to provide higher transfer speeds while containing the implementation costs and maintaining compatibility with other requirements set by RF communication standards.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a radio frequency module comprising: a first filter configured to band-pass frequencies for a first transmit sub-band of a first communication band; a second filter configured to band-pass frequencies for a second transmit sub-band of the first communication band; a third filter configured to band-pass frequencies for a receive band of the first communication band; an antenna terminal; and at least one antenna switch module configured to connect the third filter and one of the first and second filters to the antenna terminal.

In some embodiments, the frequencies for the first transmit sub-band overlap frequencies for a network signal band and the frequencies for the second transmit sub-band do not overlap the frequencies for the network signal band.

In some embodiments, the at least one antenna switch module is configured to connect the first filter to the antenna terminal when the network signal band is not active and connect the second filter to the antenna terminal when the network signal band is active.

In some embodiments, the at least one antenna switch module includes a first antenna switch module configured to connect the first communication band to the antenna filter and a second antenna switch module configured to connect the one of the first and second filters to the first antenna switch module.

In some embodiments, the radio frequency module further comprises an adjustable phase shifter connected between the third filter and the first antenna switch module and configured to match a phase of the receive band to a phase of one of the first and second transmit sub-bands.

In some embodiments, a first gap between the frequencies for the first transmit sub-band and the receive band is larger than a second gap between the frequencies for the second transmit sub-band and the receive band.

In some embodiments, a bandwidth of the receive band is greater than a bandwidth of each of the first sub-band and the second sub-band.

In some embodiments, bandwidth of the receive band and the first and second transmit sub-bands are asymmetric.

In some embodiments, the frequencies for the first transmit sub-band overlap the frequencies for the second transmit sub-band.

In some embodiments, the frequencies for each of the first and second transmit sub-bands do not overlap the frequencies for the receive band.

Another aspect is a mobile device comprising: an antenna configured to transmit and receive radio frequency signals; and a front end system coupled to the antenna and including a first filter configured to band-pass frequencies for a first transmit sub-band of a first communication band, a second filter configured to band-pass frequencies for a second transmit sub-band of the first communication band, a third filter configured to band-pass frequencies for a receive band of the first communication band, an antenna terminal, and at least one antenna switch module configured to connect the third filter and one of the first and second filters to the antenna terminal.

In some embodiments, the frequencies for the first transmit sub-band overlap frequencies for a network signal band and the frequencies for the second transmit sub-band do not overlap the frequencies for the network signal band.

In some embodiments, the at least one antenna switch module is configured to connect the first filter to the antenna terminal when the network signal band is not active and connect the second filter to the antenna terminal when the network signal band is active.

In some embodiments, the at least one antenna switch module includes a first antenna switch module configured to connect the first communication band to the antenna filter and a second antenna switch module configured to connect the one of the first and second filters to the first antenna switch module.

In some embodiments, the front end system further includes an adjustable phase shifter connected between the third filter and the first antenna switch module and configured to match a phase of the receive band to a phase of one of the first and second transmit sub-bands.

In some embodiments, a first gap between the frequencies for the first transmit sub-band and the receive band is larger than a second gap between the frequencies for the second transmit sub-band and the receive band.

In some embodiments, a bandwidth of the receive band is greater than a bandwidth of each of the first sub-band and the second sub-band.

Yet another aspect is a radio frequency module comprising: a front end including a first filter configured to band-pass frequencies for a first transmit sub-band of a first communication band, a second filter configured to band-pass frequencies for a second transmit sub-band of the first communication band, a third filter configured to band-pass frequencies for a receive band of the first communication band, an antenna terminal, and at least one antenna switch module configured to connect the third filter and one of the first and second filters to the antenna terminal; and an antenna coupled to the antenna terminal, the front end and the antenna being enclosed within a common package.

In some embodiments, the frequencies for the first transmit sub-band overlap frequencies for a network signal band and the frequencies for the second transmit sub-band do not overlap the frequencies for the network signal band.

In some embodiments, the at least one antenna switch module is configured to connect the first filter to the antenna terminal when the network signal band is not active and connect the second filter to the antenna terminal when the network signal band is active.

DETAILED DESCRIPTION

Figure 1A:
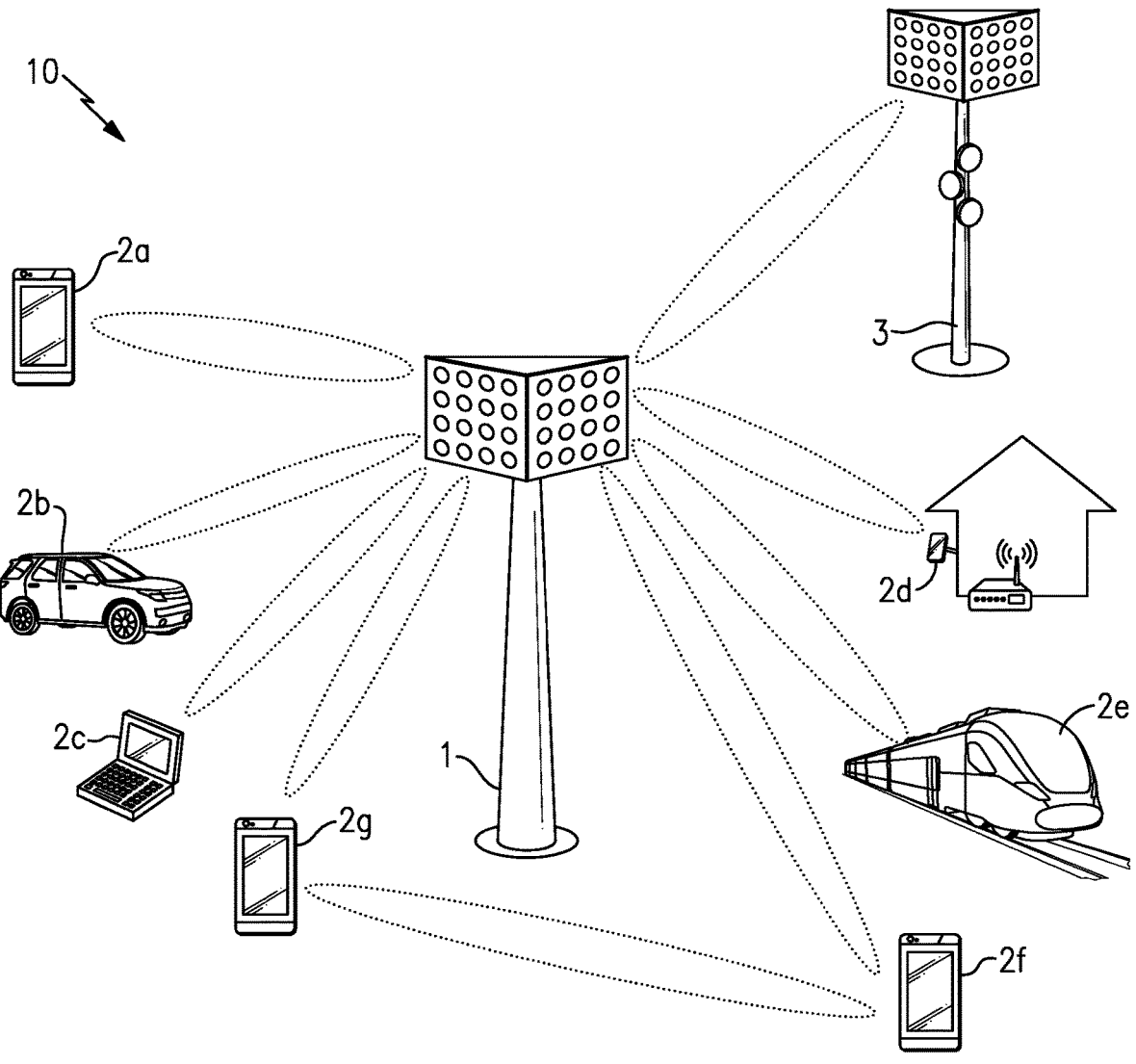
FIG. 1A is a schematic diagram of one example of a communication network.

The 5G NR communication standard introduced asymmetrical uplink and downlink bandwidths. These asymmetric bandwidths pose challenges for front end design for bands that were sub-divided in 4G LTE to address spurious emission requirements. For example, band B28 (703-748 MHz) Tx and (758-803 MHz) Rx was divided into sub-band B28A (703-733 MHz) Tx and (758-788 MHz) Rx and sub-band B28B (718-748 MHz) Tx and (773-803 MHz) Rx. This sub-division assisted manufactures to design front end solutions to satisfy 3GPP NS17 and improved GAP frequency cross-over rejection, but limited the usable bandwidth to 30 MHz for sub-bands B28A and B28B.

This sub-division for band B28 was widely adopted in 4G LTE as the maximum allowed bandwidth is 20 MHz. However, in 5G NR wider bandwidths were introduced. Aspects of this disclosure combine a full frequency range n28F (758-803 MHz) Rx filter or a China only frequency range n28C (758-798) Rx filter with sub-band B28A (703-733 MHz) Tx and B28B (718-748 MHz) Tx filters. This allows the combination of either n28A, Tx with n28F, Rx or n28B, Tx with n28F/n28C, Rx. Aspects of this disclosure also allow wider asymmetrical downlinks for 5G NR signals while maintaining the benefits of improved NS17 support and improved GAP frequency cross-over rejection from separating the Tx into sub-bands.

Overview of Radio Frequency Communication

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Example Communication Networks and Wireless Communication Devices

FIG. 1A is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1A, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1A supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1A. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1A, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1A can be used to support a wide variety of advanced communication features, including, but not limited to, eMBB, uRLLC, and/or mMTC.

Figure 1B:
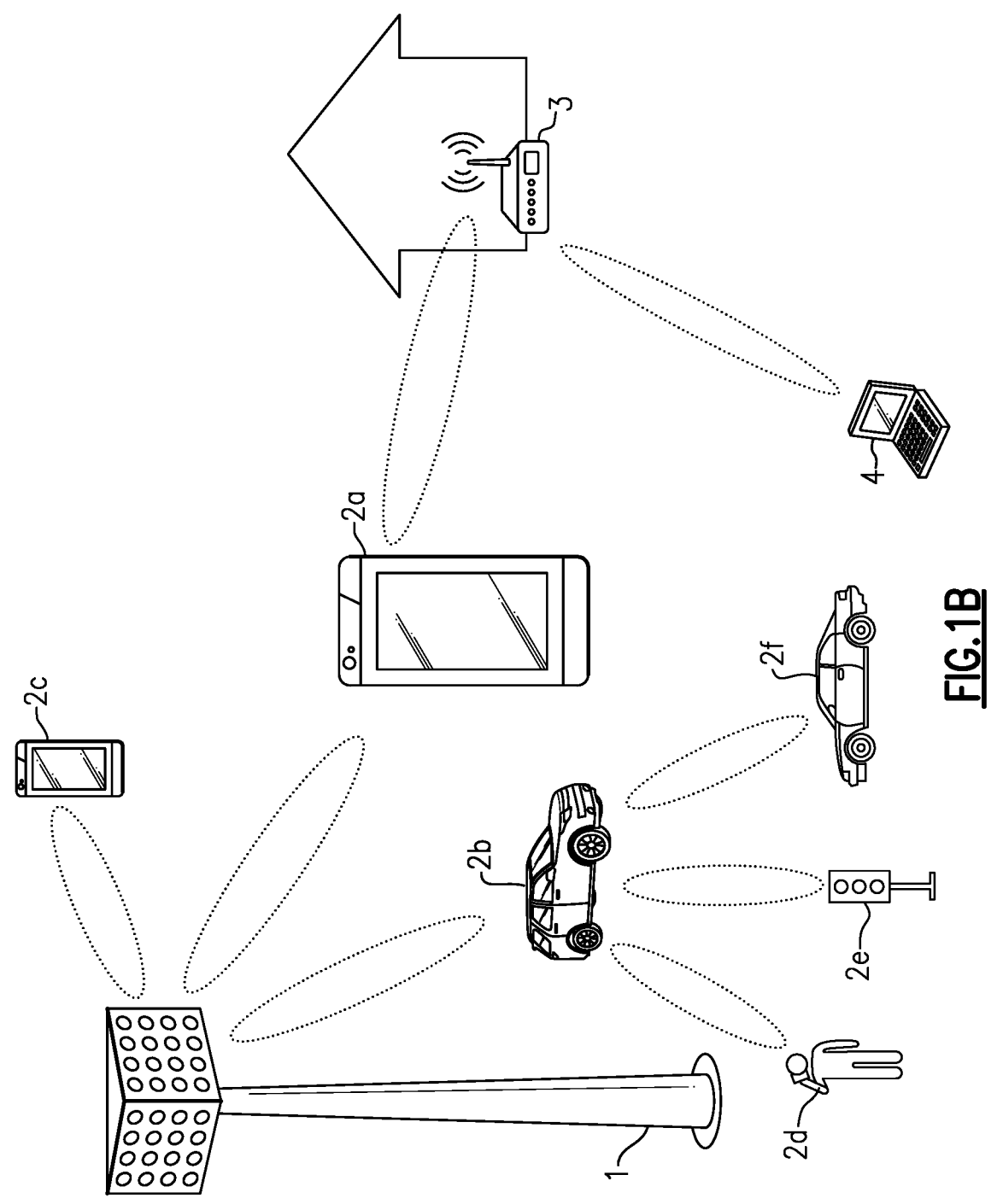
FIG. 1B is a schematic diagram of one example of a mobile device communicating via cellular and WiFi networks.

FIG. 1B is a schematic diagram of one example of a mobile device 2a communicating via cellular and WiFi networks. For example, as shown in FIG. 1B, the mobile device 2a communicates with a base station 1 of a cellular network and with a WiFi access point 3 of a WiFi network. FIG. 1B also depicts examples of other user equipment (UE) communicating with the base station 1, for instance, a wireless-connected car 2b and another mobile device 2c. Furthermore, FIG. 1B also depicts examples of other WiFi-enabled devices communicating with the WiFi access point 3, for instance, a laptop 4.

Although specific examples of cellular UE and WiFi-enabled devices is shown, a wide variety of types of devices can communicate using cellular and/or WiFi networks. Examples of such devices, include, but are not limited to, mobile phones, tablets, laptops, Internet of Things (IoT) devices, wearable electronics, customer premises equipment (CPE), wireless-connected vehicles, wireless relays, and/or a wide variety of other communication devices.

In certain implementations, UE, such as the mobile device 2a of FIG. 1B, is implemented to support communications using a number of technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

Furthermore, certain UE can communicate not only with base stations and access points, but also with other UE. For example, the wireless-connected car 2b can communicate with a wireless-connected pedestrian 2d, a wireless-connected stop light 2e, and/or another wireless-connected car 2f using vehicle-to-vehicle (V2V) and/or vehicle-to-everything (V2X) communications.

Although various examples of communication technologies have been described, mobile devices can be implemented to support a wide range of communications.

Various communication links have been depicted in FIG. 1B. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

Different users of the illustrated communication networks can share available network resources, such as available frequency spectrum, in a wide variety of ways. In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDM is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Certain RF communication systems include multiple transceivers for communicating using different wireless networks, over multiple frequency bands, and/or using different communication standards. Although implementing an RF communication system in this manner can expand functionality, increase bandwidth, and/or enhance flexibility, a number of coexistence issues can arise between the transceivers operating within the RF communication system.

For example, an RF communication system can include a cellular transceiver for processing RF signals communicated over a cellular network and a wireless local area network (WLAN) transceiver for processing RF signals communicated over a WLAN network, such as a WiFi network. For instance, the mobile device 2a of FIG. 1B is operable to communicate using cellular and WiFi networks.

Although implementing the RF communication system in this manner can provide a number of benefits, a mutual desensitization effect can arise from cellular transmissions interfering with reception of WiFi signals and/or from WiFi transmissions interfering with reception of cellular signals.

In one example, cellular Band 7 can give rise to mutual desensitization with respect to 2.4 Gigahertz (GHz) WiFi. For instance, Band 7 has an FDD duplex and operates over a frequency range of about 2.62 GHz to 2.69 GHz for downlink and over a frequency range of about 2.50 GHz to about 2.57 GHz for uplink, while 2.4 GHz WiFi has TDD duplex and operates over a frequency range of about 2.40 GHz to about 2.50 GHz. Thus, cellular Band 7 and 2.4 GHz WiFi are adjacent in frequency, and RF signal leakage due to the high power transmitter of one transceiver/front end affects receiver performance of the other transceiver/front end, particularly at border frequency channels.

In another example, cellular Band 40 and 2.4 GHz WiFi can give rise to mutual desensitization. For example, Band 40 has a TDD duplex and operates over a frequency range of about 2.30 GHz to about 2.40 GHz, while 2.4 GHz WiFi has TDD duplex and operates over a frequency range of about 2.40 GHz to about 2.50 GHz. Accordingly, cellular Band 40 and 2.4 GHz WiFi are adjacent in frequency and give rise to a number of coexistence issues, particularly at border frequency channels.

Desensitization can arise not only from direct leakage of an aggressor transmit signal to a victim receiver, but also from spectral regrowth components generated in the transmitter. Such interference can lie relatively closely in frequency with the victim receive signal and/or directly overlap it.

Figure 2:
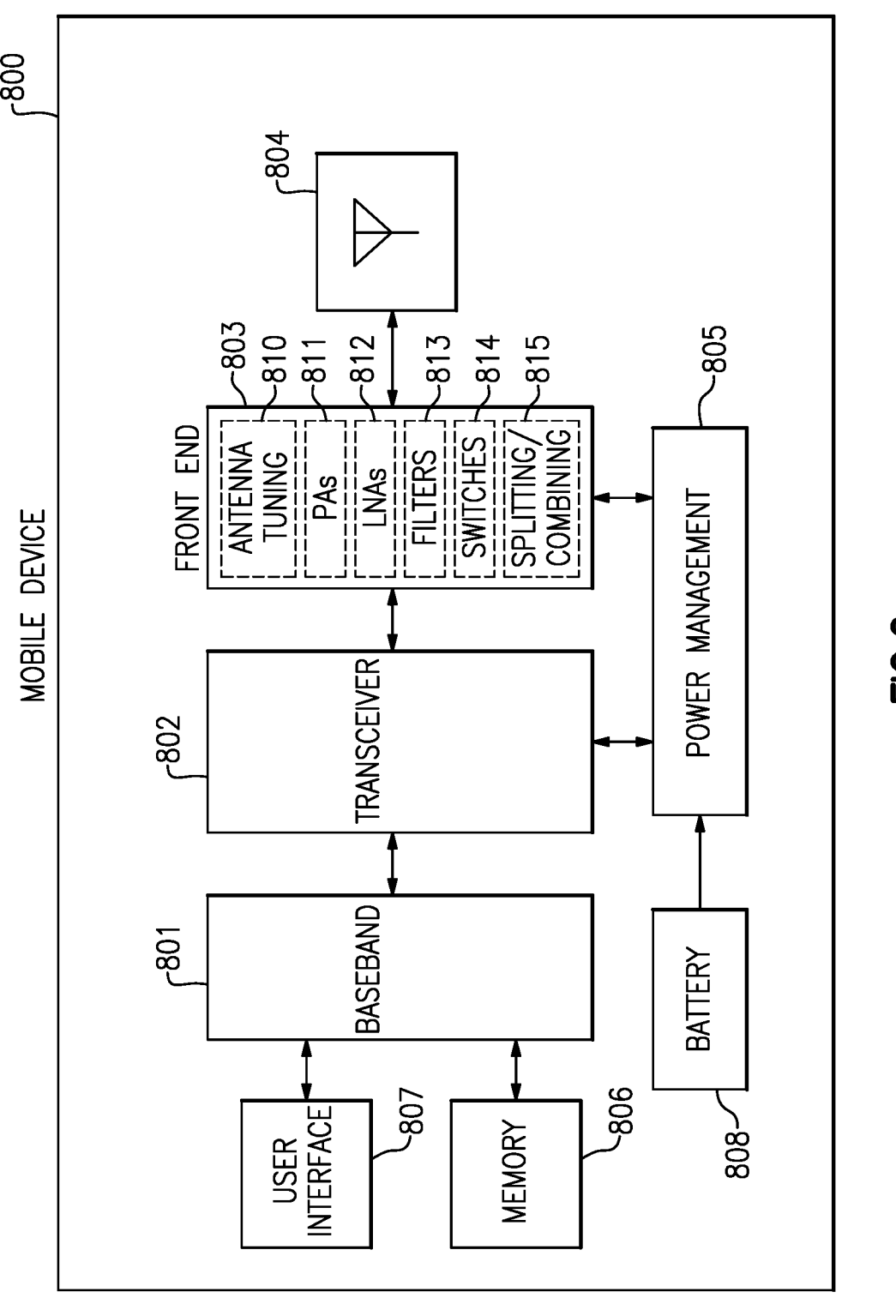
FIG. 2 is a schematic diagram of one embodiment of a mobile device.

FIG. 2 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 2 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 2, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 2, the power management system 805 receives a battery voltage from the battery 808. The battery 808 can be any suitable battery for use in the mobile device 800, including, for example, a lithium-ion battery.

Figure 3:
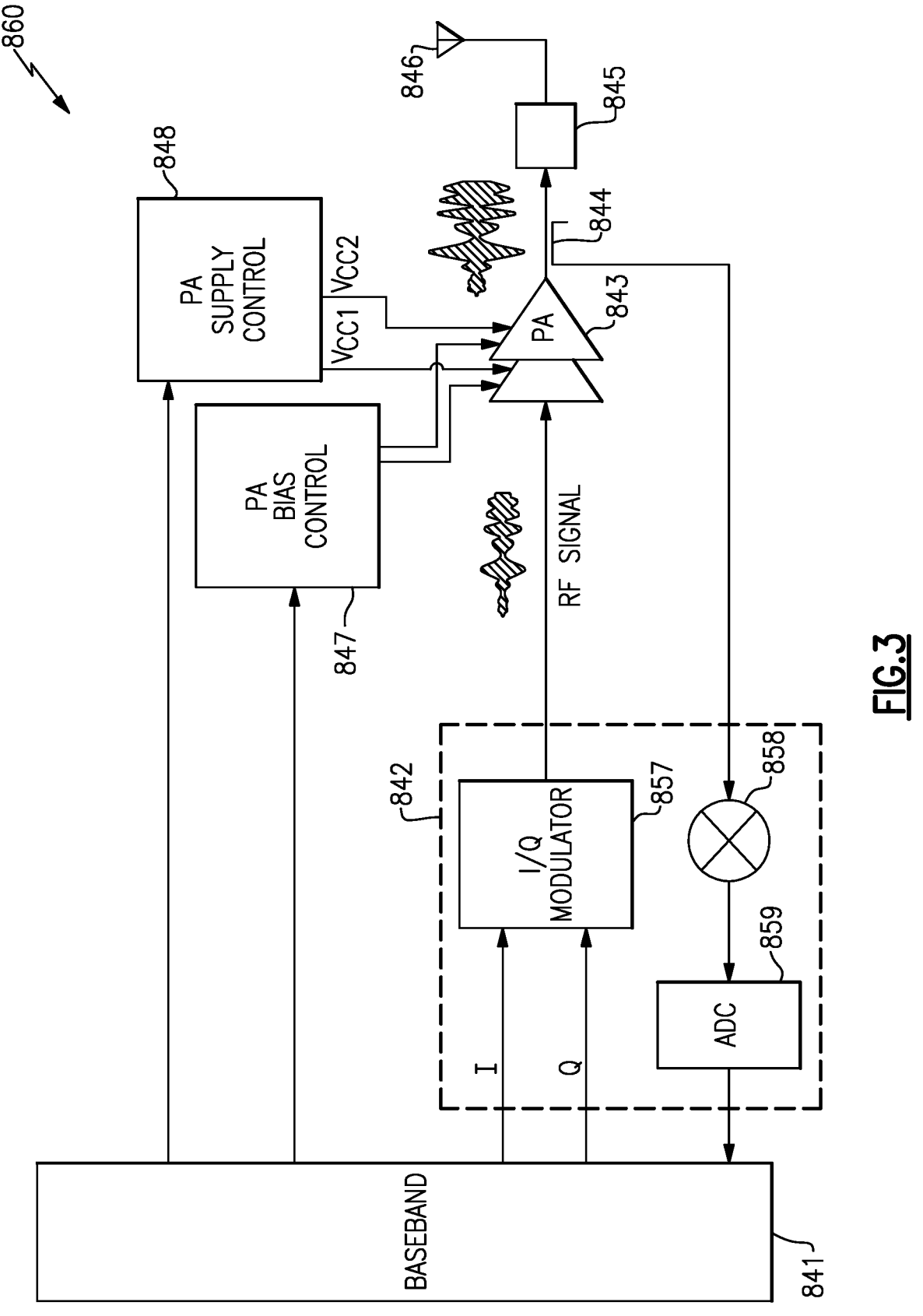
FIG. 3 is a schematic diagram of a power amplifier system according to one embodiment.

FIG. 3 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, diplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 3, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Example Filter Banks for Overlapping Frequency Bands

Cellular communication networks may regularly broadcast a set of network signal (NS) values in order to communicate with one or more mobile devices. The bands used by network signals may be protected such that mobile devices are prevented from using the network signaling bands when a base station is communicating using the network signal. One or more of the network signal bands may at least partially overlap with an RF band used for wireless communications. One such example is the B28 Tx (703-748 MHz) and the NS17 network signal (410-710 MHz).

The NS17 network signal is a protected band for which no other RF band can use while the NS17 network signal is active. In some communication standard, when the NS17 signal is activated in the cell, the power of any UE emission cannot exceed a predetermined level (e.g., −26.3 dBm over a 6 MHz bandwidth measurement.

Figure 4:
FIG. 4 is an example chart showing a network signal band and a split RF band.
Figure 4:
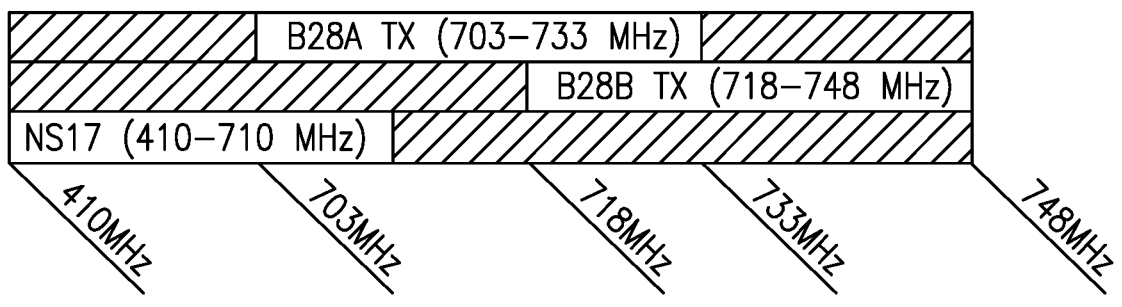
Figure 5:
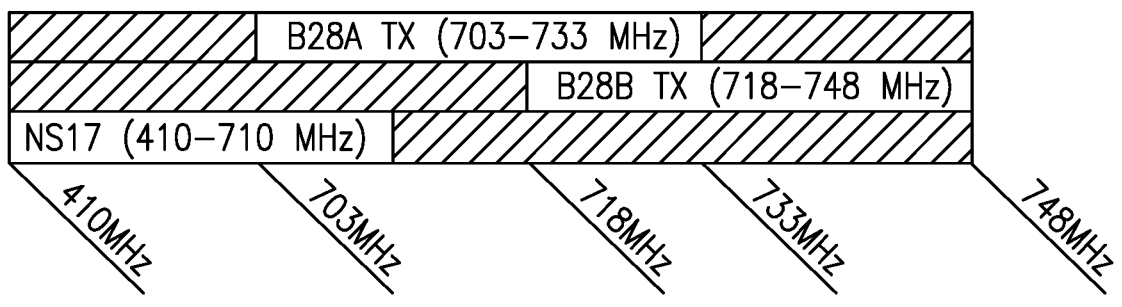
FIG. 5 is an example block diagram illustrating a portion of a front end system configured to implement the bands illustrated in FIG. 4 in accordance with aspects of this disclosure.

One technique for addressing the above-discussed overlap between band B28 and the NS17 network signal is to split the RF band into two portions, one of which overlaps with the network signal band and one of which does not overlap with the network signal band. FIG. 4 is an example chart showing a network signal band and a split RF band. In particular, FIG. 4 shows the example in which B28 Tx is split into two sub-bands B28A Tx and B28B Tx. FIG. 5 is an example block diagram illustrating a portion of a front end system configured to implement the bands illustrated in FIG. 4 in accordance with aspects of this disclosure. This embodiment may be used, for example, when implementing the 4G LTE communication standard.

With reference to FIG. 4, band B28 is split into sub-band B28A Tx (703-733 Mhz) and sub-band B28B (718-748 MHz). Sub-band B28A Tx (703-733 Mhz) partially overlaps with the NS17 network signal (410-710 MHz), while sub-band B28B (718-748 MHz) does not overlap with the NS17 network signal (410-710 MHz).

With reference to FIG. 5, the front end 100 includes an antenna terminal 102, an antenna switch module 104, and a plurality of filters including a first filter 106a, a second filter 160b, a third filter 106c, a fourth filter 106d, a fifth filter 106e, and a sixth filter 106f. The first filter 106a comprises a diplexer with a first band-pass filter for sub-band B28A Tx and a second band-pass filter for sub-band B28A Rx, the second filter 106b comprises a diplexer with a third band-pass filter for sub-band B28B Tx and a fourth band-pass filter for sub-band B28B Rx, the third filter 106c comprises a diplexer with a fifth band-pass filter for band B12 Tx and a sixth band-pass filter for band B12 Rx, the fourth filter 106d comprises a diplexer with a seventh band-pass filter for band B8 Tx and an eighth band-pass filter for band B8 Rx, the fifth filter 106e comprises a diplexer with a ninth band-pass filter for band B20 Tx and a tenth band-pass filter for band B20 Rx, and the sixth filter 106f comprises a diplexer with an eleventh band-pass filter for band B26 Tx and a twelfth band-pass filter for band B26 Rx. However, FIG. 5 is merely one example set of filters 106a-106f, and in other embodiments the front end 100 can include a greater or fewer number of filters configured to filter a different set of bands as well as a different configuration of the individual filters 106a-106f such as triplexers, quad-plexers, etc.

In order to implement sub-bands B28A and B28B, the front end 100 includes the first and second filters 106a and 106b. The antenna switch module 104 can connect the antenna terminal 102 to one of the first and second filters 106a and 106b depending on whether the mobile device is communicating using sub-bands B28A or B28B. For example, when the base station is communicating using the NS17 network signal, the antenna switch module 104 can connect the antenna terminal 102 to the second filter 106b such that the mobile device communicates using sub-band B28B, thereby preventing any overlap between the network signaling and the RF communication on sub-band B28B. In addition, when the base station is not communicating using the NS17 network signal, the antenna switch module 104 can connect the antenna terminal 102 to either of the first and second filters 106a and 106b since there is no risk of any overlap between the network signaling and the RF communication on sub-bands B28A and B28B.

The above discussed implementation of FIGS. 4 and 5 may meet the bandwidth requirements for certain communication standards, such as 4G LTE. In particular, 4G LTE may define a maximum allowed bandwidth signals of 20 MHz, which can be achieved by either of sub-band B28A and sub-band 28B. In some implementations, n28 supports 30 MHz in the uplink/downlink and Tx is confined to the sub-bands n28A and n28B. By splitting the B28 Tx band into sub-bands B28A and B28B, the front end 100 of FIGS. 4 and 5 is able to satisfy the requirements of 3GPP NS17 (e.g., that no band can overlap with the frequencies reserved for NS17) while still enabling communication on band B28.

However, the split of B28 into sub-bands B28A and B28B of FIGS. 4 and 5 may not support the requirements of future communication standards, such as the future evolution of 5G NR. For example, 5G NR may introduce asymmetrical uplink/downlink bandwidths UL/DL BWs are expected to be introduced. In particular, it is desirable to provide additional bandwidth on the downlink in order to increase user download speeds, while an increase in the uplink bandwidth may not have as large an effect on user experience.

Figure 6:
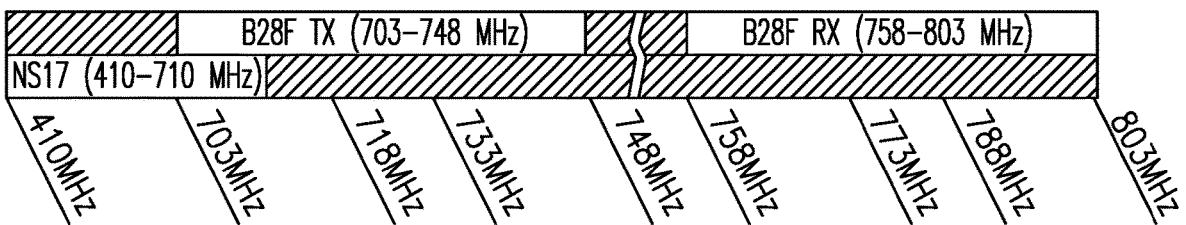
FIG. 6 is an example chart showing a network signal band and an RF band.
Figure 7:
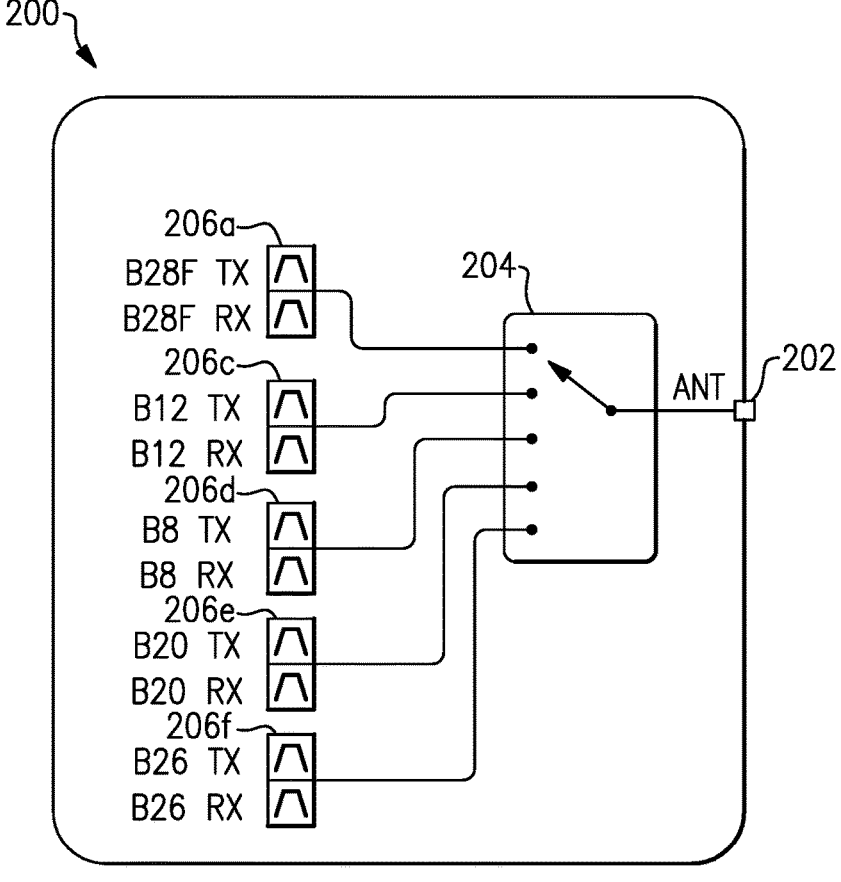
FIG. 7 is an example block diagram illustrating a portion of a front end system configured to implement the band illustrated in FIG. 6 in accordance with aspects of this disclosure.

FIG. 6 is an example chart showing a network signal band and an RF band. In particular, FIG. 6 shows the example showing B28 Tx and B28 Rx. FIG. 7 is an example block diagram illustrating a portion of a front end system 200 configured to implement the band illustrated in FIG. 6 in accordance with aspects of this disclosure. This embodiment may be used, for example, when implementing the 5G NR communication standard with a larger bandwidth than the embodiment of FIGS. 4 and 5.

With reference to FIG. 6, the full band B28F is used for both band B28F Tx (703-748 MHz) and band B28F Rx (758-803 MHz). By using the full band B28F Tx and Rx, the bandwidth can be increased compared to the embodiment in which band B28 is split into sub-bands B28A and B28B as in FIGS. 4 and 5. However, since band B28F Tx overlaps (703-748 MHz) with the NS17 network signal (410-710 MHz), band B28F cannot be used while the base station is communicating using the NS17 network signal.

With reference to FIG. 7, the front end 200 includes an antenna terminal 202, an antenna switch module 204, and a plurality of filters including a first filter 206a, a third filter 206c, a fourth filter 206d, a fifth filter 206e, and a sixth filter 206f. The first filter 206a comprises a diplexer with a first band-pass filter for band B28F Tx and a second band-pass filter for band B28F Rx. The second to sixth filters 206c-206f are substantially the same as the second to sixth filters 106c-106f of FIG. 5.

By using the full B28F bandwidth, the front end 200 is able to provide an improvement in bandwidth compared to the split band implementation of FIGS. 4 and 5. However, since the front end 200 of FIG. 7 includes a single filter 206a for band B28F, the mobile device using the front end 200 is unable to use band B28F while the base station is communicating using the NS17 network signal. Thus, it is desirable to provide an implementation which can provide an increased bandwidth, while also operate concurrently with the base station using the NS17 network signal.

One limitation of the embodiment of FIGS. 6 and 7 is that the front end 200 provides no rejection for 3GPP NS17 and has an increased linearity requirement on the power amplifier. This implementation further increases the power amplifier linearity requirement due to the increase in insertion loss in the B28F TX filter in the first filter 206a compared to filters for sub-bands B28A Tx and B28B Tx (see the first and second filters 306a and 306b of FIG. 9A). As a result, this implementation has a higher power amplifier current consumption. While the implementation of FIGS. 6 and 7 could support the maximum allowed bandwidth signals of 20 MHz in 4G LTE, it can be difficult to meet the 3GPP NS17 requirement.

Figure 8:
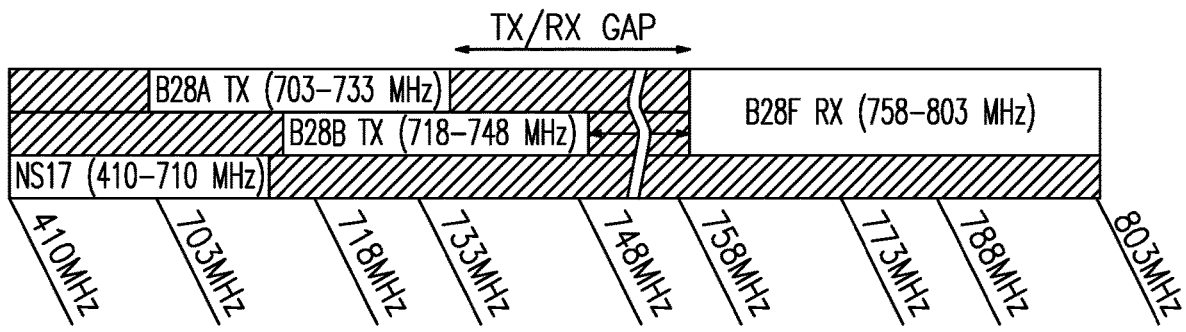
FIG. 8 is an example chart showing a network signal band and a split RF band.
Figure 9A:
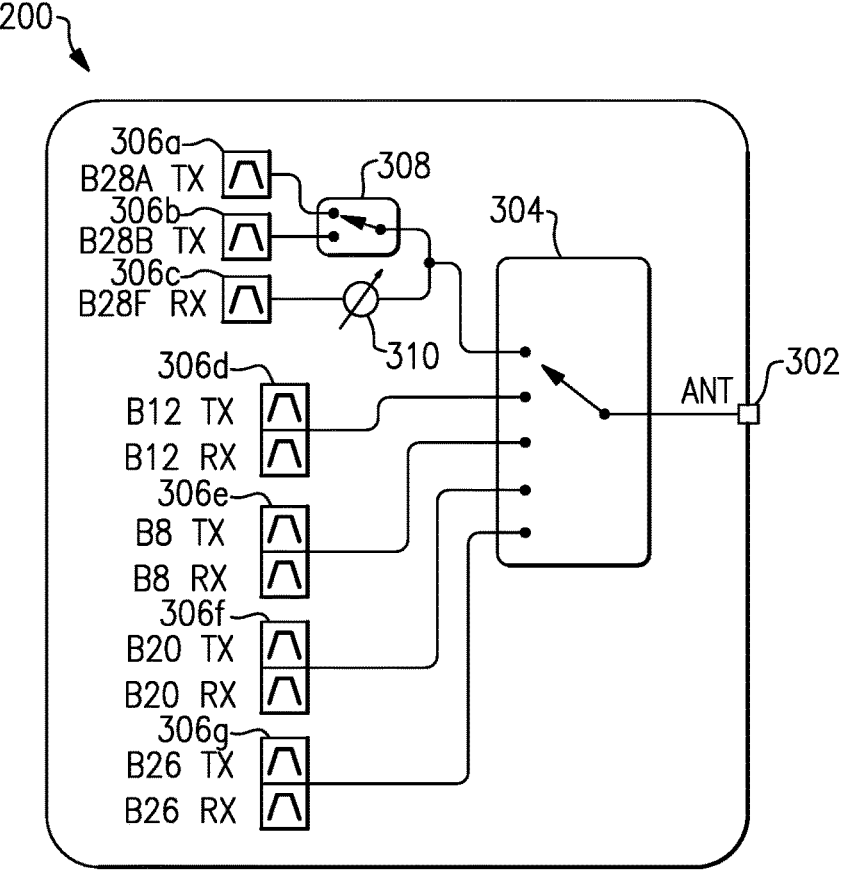
FIG. 9A is an example block diagram illustrating a portion of a front end system configured to implement the split band B28 illustrated in FIG. 8 in accordance with aspects of this disclosure.

FIG. 8 is an example chart showing a network signal band and a split RF band. In particular, FIG. 8 shows the example showing B28 Tx split into B28A Tx and B28B Tx as well as B28F Rx. FIG. 9A is an example block diagram illustrating a portion of a front end system 300 configured to implement the split band B28 illustrated in FIG. 8 in accordance with aspects of this disclosure. This embodiment may be used, for example, when implementing the 5G NR communication standard with a larger bandwidth than the embodiment of FIGS. 4 and 5 and maintaining the ability to communicate using band B28 while the base station using the NS17 network signal.

With reference to FIG. 8, the transmit portion of band B28 Tx is split into sub-bands B28A Tx (703-733 MHz) and B28B Tx (718-748 MHz) while the full band B28F Rx (758-803 MHz) is used. By using the full receive band B28F Rx, the downlink bandwidth can be increased compared to the embodiment in which band B28 is split into sub-bands B28A and B28B as in FIGS. 4 and 5. In addition, by splitting the transmit band B28F Tx into sub-band B28A Tx and band 28B Tx, the front end can select one of the sub-band B28A Tx and sub-band 28B Tx to use depending on whether the base station is currently using the NS17 network signal, thereby allowing sub-band B28 to be used concurrently with the NS17 network signal.

With reference to FIG. 9A, the front end 300 includes an antenna terminal 302, a first antenna switch module 304, and a plurality of filters including a first filter 306a, a second filter 306b, a third filter 306c, a fourth filter 306d, a fifth filter 306e, a sixth filter 306f, a seventh filter 306g, a second antenna switch module 308, and an adjustable phase shifter 310. The first filter 306a includes a first band-pass filter for sub-band B28A Tx, the second filter 306b includes a second band-pass filter for sub-band B28B Tx, and the third filter 306c includes a third band-pass filter for band B28F Rx. The third to seventh filters 306d-306g are substantially the same as the second to sixth filters 106c-106f of FIG. 5.

The second antenna switch module 308 is configured to connect the first antenna switch module 304 to one of the first filter 306a and the second filter 306b. The adjustable phase shifter 310 is configured to match the phase of the band B28F Rx signal to the phase of the Tx signal from the connected B28 filter (e.g., the first filter 306a or the second filter 306b).

Figure 9B:
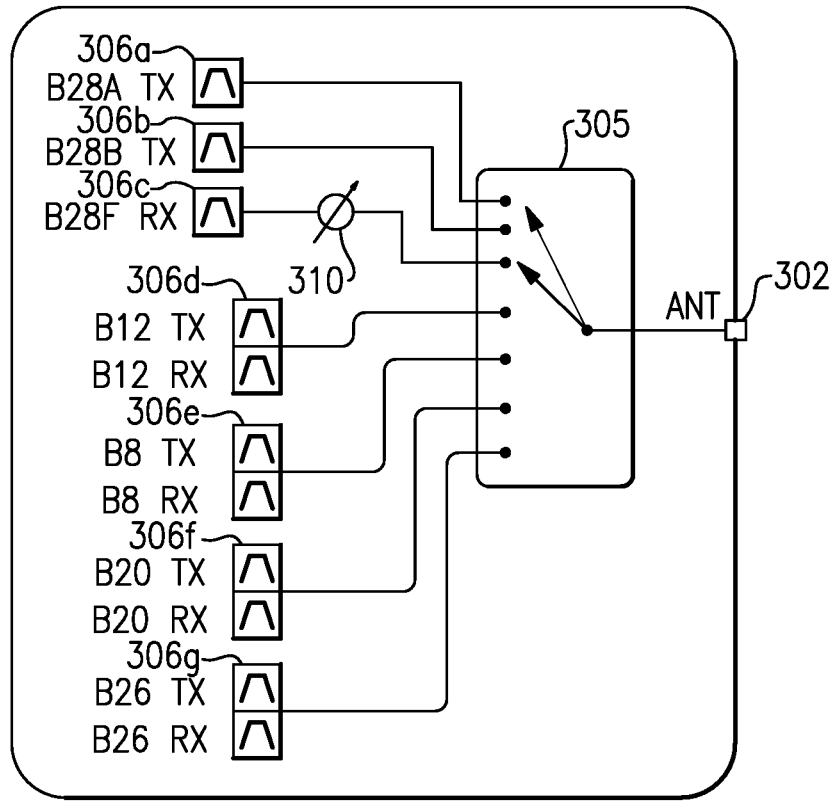
FIG. 9B is another example block diagram illustrating a portion of a front end system configured to implement the split band B28 illustrated in FIG. 8 in accordance with aspects of this disclosure.

FIG. 9B is another example block diagram illustrating a portion of a front end system configured to implement the split band B28 illustrated in FIG. 8 in accordance with aspects of this disclosure. The front end 300 of FIG. 9B is similar to the embodiment of FIG. 9A with the exception of each of the sub-bands B28A Tx, B28B Tx, and B28F Rx being separately connected to a multi-throw antenna switch module 305. The antenna switch module 305 can include two or more throws, one of which can be used to select one of the transmit sub-bands B28A Tx and B28B Tx and the other of which can be used to select the receive sub-band B28F Rx when operating in band B28.

The above discussed implementation of FIGS. 8, 9A, and 9B can meet the bandwidth requirements for certain communication standards including asymmetrical uplink/downlink bandwidths, for example, as are proposed for 5G NR while also allowing for the use of the transmit sub-band B28B Tx simultaneous with the NS17 network signal. In particular, the receive band B28F Rx (758-803 MHz) allows for bandwidths of greater than 30 MHz (e.g., up to 45 MHz) for the downlink while maintaining the benefits of NS17 support by selectively using one of sub-band B28A Tx and sub-band 28B Tx similar to the embodiment of FIGS. 4 and 5. The embodiment can also improve the GAP frequency cross-over rejection from separating the TX into sub-bands. For example, the second antenna switch module 308 can connect the first filter 306a to implement sub-band B28A Tx to provide a larger gap with band B28F Rx (e.g., the gap between the upper end of sub-band B28A Tx at 733 MHz and the lower end of sub-band B28F Rx at 758 MHz) when NS17 signaling is not present.

In an alternative embodiment, the second antenna switch module 308 can be configured to connect the first antenna switch module 304 to one of: the first filter 306a, the second filter 306b, and an eighth filter (not illustrated) substantially the same as the transmit pass-band filter of the first filter 206a illustrated in FIG. 7. In this embodiment, the second antenna switch module 308 can use the full transmit bandwidth for band B28F Tx (703-748 MHz, see FIG. 6). The second antenna switch module 308 can also use of off the first and second filters 306a and 306b to increase the gap with the receive band B28F Rx or to avoid overlapping with the NS17 signaling. This alternative embodiment can enable both asymmetrical uplink/downlink bandwidth similar to the embodiment of FIGS. 8, 9A, and 9B as well as the symmetrical full bandwidth of FIGS. 6 and 7, depending on the situation.

Figure 10:
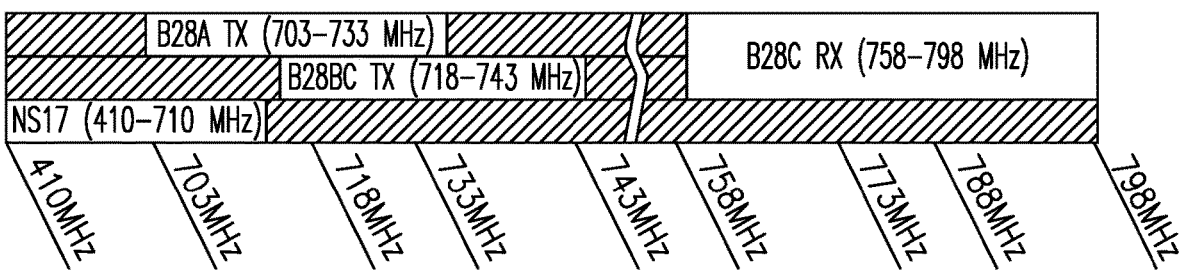
FIG. 10 is an example chart showing a network signal band and a split RF band for an alternative communication standard.
Figure 11:
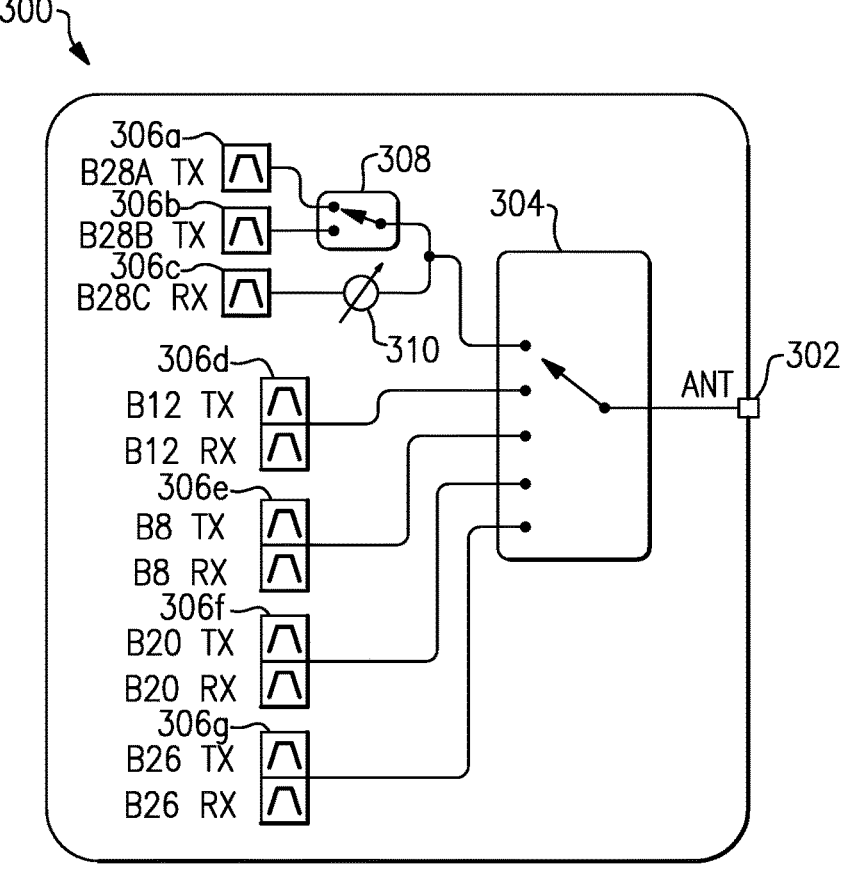
FIG. 11 is an example block diagram illustrating a portion of a front end system configured to implement the split band B28 illustrated in FIG. 10 in accordance with aspects of this disclosure.

FIG. 10 is an example chart showing a network signal band and a split RF band for an alternative communication standard. In particular, FIG. 10 shows the example showing B28 Tx split into sub-band B28A Tx and sub-band B28C Tx as well as sub-band B28C Rx. FIG. 11 is an example block diagram illustrating a portion of a front end system 400 configured to implement the split band B28 illustrated in FIG. 10 in accordance with aspects of this disclosure. This embodiment may be used, for example, when implementing the 5G NR communication standard similar to the embodiment of FIGS. 8, 9A, and 9B with frequencies that meet the requirements of a certain region (e.g., for communications within China). This implementation allows for communication with a larger bandwidth than the embodiment of FIGS. 4 and 5 and maintaining the ability to communicate using band B28 while the base station using the NS17 network signal.

With reference to FIG. 10, the transmit portion of band B28 Tx is split into sub-band B28A Tx (703-733 MHz) and sub-band B28C Tx (718-743 MHz) while the full band B28C Rx (758-798 MHz) is used. By using the full receive band B28C Rx, the downlink bandwidth can be increased compared to the embodiment in which band B28 is split into sub-bands B28A and B28B as in FIGS. 4 and 5. In addition, by splitting the transmit band B28F Tx into band B28A Tx and band 28C Tx, the front end can select one of the sub-band B28A Tx and sub-band 28B Tx to use depending on whether the base station is currently using the NS17 network signal, thereby allowing band B28 to be used concurrently with the NS17 network signal.

With reference to FIG. 11, the front end 300 is substantially similar to the front end of FIG. 9A and includes an antenna terminal 302, a first antenna switch module 304, and a plurality of filters including a first filter 306a, a second filter 306b, a third filter 306c, a fourth filter 306d, a fifth filter 306e, a sixth filter 306f, a seventh filter 306g, a second antenna switch module 308, and an adjustable phase shifter 310. The first filter 306a includes a first band-pass filter for sub-band B28A Tx, the second filter 306b includes a second band-pass filter for sub-band B28C Tx, and the third filter 306c includes a third band-pass filter for band B28C Rx. The third to seventh filters 306d-306g are substantially the same as the second to sixth filters 106c-106f of FIG. 5.

The second antenna switch module 308 is configured to connect the first antenna switch module 304 to one of the first filter 306a and the second filter 306b. The adjustable phase shifter 310 is configured to match the phase of the band B28C Rx signal to the phase of the connected B28 filter (e.g., the first filter 306a or the second filter 306b).

The above discussed implementation of FIGS. 10 and 11 can provide some of all of the advantages discussed above in connection with FIGS. 8, 9A, and 9B when implemented to conform to communication standards in China.

Aspects of this disclosure can provide any combination of the following advantages. In some embodiments, the front end can eliminate the need to use a band B28 full frequency duplexer in order to support downlink 5G NR signals with greater than 30 MHz bandwidth. Embodiment of this disclosure can also the footprint size of a sub-band B28A and B28B Tx filters by sharing the band B28F Rx filter. Moreover, aspects of this disclosure address the problem of meeting NS17 and supporting wide 5G NR (e.g., >30 MHz) downlink signals by splitting the uplink band B28 Tx into sub-bands while maintaining the full downlink band B28F Rx. Embodiments of this disclosure can also enable the use of mixed filter technology. For example, in some embodiments TC-SAW filters can be used for Tx and MPS filters can be used for Rx. Certain implementations can also improve the cross over Tx leakage for the sub-band B28A Tx compared to full band B28F Tx implementations. Additionally, embodiments of this disclosure can improve Insertion loss, which can lead to reduced current consumption.

CONCLUSION

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

While certain embodiments have been described, these embodiments have been presented by way of example only, and are not intended to limit the scope of the disclosure.

Indeed, the novel resonators described herein may be embodied in a variety of other forms. Furthermore, various omissions, substitutions and changes in the form of the resonators described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. A radio frequency module comprising:
a first filter configured to band-pass frequencies for a first transmit sub-band of a first communication band;
a second filter configured to band-pass frequencies for a second transmit sub-band of the first communication band;
a third filter configured to band-pass frequencies for a receive band of the first communication band;
an antenna terminal; and
at least one antenna switch module configured to connect the third filter and one of the first and second filters to the antenna terminal.

2. The radio frequency module of claim 1 wherein the frequencies for the first transmit sub-band overlap frequencies for a network signal band and the frequencies for the second transmit sub-band do not overlap the frequencies for the network signal band.

3. The radio frequency module of claim 2 wherein the at least one antenna switch module is configured to connect the first filter to the antenna terminal when the network signal band is not active and connect the second filter to the antenna terminal when the network signal band is active.

4. The radio frequency module of claim 1 wherein the at least one antenna switch module includes a first antenna switch module configured to connect the first communication band to the antenna filter terminal and a second antenna switch module configured to connect the one of the first and second filters to the first antenna switch module.

5. The radio frequency module of claim 4 further comprising an adjustable phase shifter connected between the third filter and the first antenna switch module and configured to match a phase of the receive band to a phase of one of the first and second transmit sub-bands.

6. The radio frequency module of claim 1 wherein a first gap between the frequencies for the first transmit sub-band and the receive band is larger than a second gap between the frequencies for the second transmit sub-band and the receive band.

7. The radio frequency module of claim 1 wherein a bandwidth of the receive band is greater than a bandwidth of each of the first sub-band and the second sub-band.

8. The radio frequency module of claim 1 wherein bandwidth of the receive band and the first and second transmit sub-bands are asymmetric.

9. The radio frequency module of claim 1 wherein the frequencies for the first transmit sub-band overlap the frequencies for the second transmit sub-band.

10. The radio frequency module of claim 1 wherein the frequencies for each of the first and second transmit sub-bands do not overlap the frequencies for the receive band.

11. A mobile device comprising:
an antenna configured to transmit and receive radio frequency signals; and
a front end system coupled to the antenna and including a first filter configured to band-pass frequencies for a first transmit sub-band of a first communication band, a second filter configured to band-pass frequencies for a second transmit sub-band of the first communication band, a third filter configured to band-pass frequencies for a receive band of the first communication band, an antenna terminal, and at least one antenna switch module configured to connect the third filter and one of the first and second filters to the antenna terminal.

12. The mobile device of claim 11 wherein the frequencies for the first transmit sub-band overlap frequencies for a network signal band and the frequencies for the second transmit sub-band do not overlap the frequencies for the network signal band.

13. The mobile device of claim 12 wherein the at least one antenna switch module is configured to connect the first filter to the antenna terminal when the network signal band is not active and connect the second filter to the antenna terminal when the network signal band is active.

14. The mobile device of claim 11 wherein the at least one antenna switch module includes a first antenna switch module configured to connect the first communication band to the antenna terminal and a second antenna switch module configured to connect the one of the first and second filters to the first antenna switch module.

15. The mobile device of claim 14 wherein the front end system further includes an adjustable phase shifter connected between the third filter and the first antenna switch module and configured to match a phase of the receive band to a phase of one of the first and second transmit sub-bands.

16. The mobile device of claim 11 wherein a first gap between the frequencies for the first transmit sub-band and the receive band is larger than a second gap between the frequencies for the second transmit sub-band and the receive band.

17. The mobile device of claim 11 wherein a bandwidth of the receive band is greater than a bandwidth of each of the first sub-band and the second sub-band.

18. A radio frequency module comprising:

a front end including a first filter configured to band-pass frequencies for a first transmit sub-band of a first communication band, a second filter configured to band-pass frequencies for a second transmit sub-band of the first communication band, a third filter configured to band-pass frequencies for a receive band of the first communication band, an antenna terminal, and at least one antenna switch module configured to connect the third filter and one of the first and second filters to the antenna terminal; and an antenna coupled to the antenna terminal, the front end and the antenna being enclosed within a common package.

19. The radio frequency module of claim 18 wherein the frequencies for the first transmit sub-band overlap frequencies for a network signal band and the frequencies for the second transmit sub-band do not overlap the frequencies for the network signal band.

20. The radio frequency module of claim 19 wherein the at least one antenna switch module is configured to connect the first filter to the antenna terminal when the network signal band is not active and connect the second filter to the antenna terminal when the network signal band is active.

* * * * *